United States Patent [19]
Bell

[11] Patent Number: 5,316,327
[45] Date of Patent: May 31, 1994

[54] CHAINLESS BICYCLE WITH DUAL DRIVE SHAFTS AND FLOATING DRIVE TRAIN SUSPENSION SYSTEM

[76] Inventor: James H. Bell, 1201 Hwy. 35, West Columbia, Tex. 77486

[21] Appl. No.: 46,301

[22] Filed: Apr. 15, 1993

[51] Int. Cl.$^5$ .............................................. B62M 1/02
[52] U.S. Cl. ..................................... 280/260; 280/284
[58] Field of Search ............... 280/259, 260, 262, 284; 74/347, 350

[56] References Cited

U.S. PATENT DOCUMENTS

| | | | |
|---|---|---|---|
| 506,685 | 10/1893 | Fryer | 280/260 |
| 616,571 | 12/1898 | Harden | 280/260 |
| 620,929 | 3/1899 | Jocelyn | 280/260 |
| 668,784 | 2/1901 | Travis | 280/260 |
| 712,698 | 11/1902 | Master | 74/347 |
| 3,861,715 | 1/1975 | Mendoza | 280/260 |
| 4,421,337 | 12/1983 | Pratt | 280/284 X |

Primary Examiner—Richard M. Camby
Assistant Examiner—Victor E. Johnson
Attorney, Agent, or Firm—Kenneth A. Roddy

[57] ABSTRACT

A chainless bicycle has a frame with a top bar, steering tube, front forks, front wheel, handlebar assembly, seat assembly, seat tube, and front downtube. The seat tube and front downtube extend angularly downwardly and are connected at their lower ends to a special crank hanger which pivotally supports a pedal gear box containing drive gears connected to the pedal arms. A pair of hollow support tubes connected to the pedal gear box extend rearwardly to a rear wheel gear box at each side of the rear wheel. A drive shaft is rotatably carried in each support tube and each has a bevel gear at the front end selectively engaged with the drive gears in the pedal gear box and a bevel gear at the rear end inside the rear wheel gear box. The hub of the rear wheel has a drive and braking mechanism which is connected to bevel gears at each side. The gears of the rear wheel hub are received in toothed engagement with the bevel gears in the rear wheel gear boxes. A pair of fluid shock absorbers are mounted between the rear wheel gear boxes and the seat tube. Thus, the chainless bicycle has a "floating" drive train and rear wheel suspension system to isolate the gear drive train from jarring, vibration, and impact, and prevent the gear drive members from becoming misaligned and damaged

10 Claims, 5 Drawing Sheets

CHAINLESS BICYCLE WITH DUAL DRIVE SHAFTS AND FLOATING DRIVE TRAIN SUSPENSION SYSTEM

BACKGROUND OF THE INVENTION

1. Field of the Invention

This invention relates generally to chainless bicycles, and more particularly to a chainless bicycle having a dual drive shaft and floating drive train suspension system.

2. Brief Description of the Prior Art

Since the bicycle was first invented, it has gone through several stages of development. The first bicycles were rigid frames with pedals connected directly to the front wheel. Later bicycles were provided with a chain sprocket having pedals which was rotatably mounted on the frame and connected to a smaller gear sprocket mounted on the hub of the rear wheel by a chain. Three-speed bicycles were developed which had a lightweight frame with a pedal sprocket and a series of smaller sprockets at the rear wheel which allowed the cyclist to selectively change gear ratios by a lever and flexible cable.

The three-speed bicycles were replaced by ten-speed bicycles. The ten-speed bicycles had a lightweight frame and a pedal sprocket which had a series of laterally spaced drive sprockets of various diameter and a series of laterally spaced smaller sprockets at the rear wheel. The ten-speed bicycle had a first lever for switching the chain between the pedal sprockets and a second lever for switching the chain between the rear wheel sprockets. This allowed a wider range of gear ratio selections between various combinations of pedal sprockets and rear wheel sprockets. The chain was shifted from one pedal sprocket cog to another and from one cog of the rear wheel sprocket to another by a pair of devices known as a derailleur. The derailleur was a very delicate mechanism and required frequent adjustment and repair.

Another bicycle development was a bicycle known as a "BMX" bicycle. These bicycles were small and very rugged and were used in racing on rough terrain and specially designed obstacle courses or dirt tracks wherein the participants raced over hills, birms, mud, and a variety of obstacles and performed acrobatic maneuvers such as "jumps", "wheelies", and "handlebar stands." The sport of BMX racing led to the development of very strong lightweight metal alloy frames and wheel rims and high impact plastic wheel rims. The BMX bicycle was also driven by a pedal sprocket connected to the rear wheel sprocket by a chain and usually had a low gear for torque and may or may not have had a selective gear ratio.

Recently, a new type of bicycle known as the "mountain bike" has been developed. The "mountain bike" combines the features of the ten-speed bicycle and the BMX bicycle. The "mountain bike" is used on rough mountain terrain, hiking trails, and cross country riding, wherein the cyclist rides on rocks, grass, mud, etc. The mountain bike has a very strong lightweight metal alloy frame and wheel rims and a wide selection of gear ratios, however, the mountain bike is also driven by a pedal sprocket connected to the rear wheel sprocket by a chain and has a delicate derailleur device.

Thus, the trend has been toward increasingly rugged all-terrain bicycles with a wide range of gear ratios which are ridden on very rough terrain and subjected to much abuse. Although the frames, wheels, rims, and sprockets are very strong and can withstand the abuse, the chain drive and delicate gear selection mechanisms remain the weakest link in the system. The chain is exposed to water and abrasives, such as dirt, sand, and mud. If not properly maintained, a chain can wear out in only 500 miles. A worn chain can jump off gear teeth and cause an accident.

Others have attempted to overcome these problems and provide more efficient drive mechanisms by replacing the chain drive with a single or dual drive shaft. There are several patents which disclose various chainless bicycles having single or dual drive shafts. However, the pedal drive gear and rear wheel of the bicycle are rigidly fixed to the frame of the bicycle. This rigidly fixed arrangement is unsatisfactory, since the modern bicycle is subjected to a great deal of jarring, vibration, and impact, and the rigidly fixed gears would soon become misaligned and, damaged.

Fryer, U.S. Pat. No. 506,685 discloses a dual drive shaft driven bicycle which has a double faced bevel gear which is moved laterally to engage either of two pinion gears or an intermediate neutral position between the bevel gears by an upstanding fulcrum lever which allows the bicycle to coast without pedaling. The drive shafts are rotatably secured to the frame of the bicycle. Thus, the drive shafts are rigidly mounted to the frame and when the gears are engaged, the pedals will constantly rotate unless they are manually disengaged by the upstanding fulcrum lever. The fulcrum lever also presents a safety hazard if the cyclist should slip or fall.

Harden, U.S. Pat. No. 616,571 discloses a dual drive shaft driven bicycle which has a pair of bevel gears at each side of the crank hanger which are constantly engaged with two pinion gears at the forward end of drive shafts. The drive shafts extend rotatably through tubular bottom run members which are rigidly secured to the crank hanger at their forward end and to the rear stays at their rearward end. The crank hanger, bottom run tubes and rear stays form an integral rigid portion of the frame. The power is applied equally on both sides of the rear wheel and there is no provision for selective gear ratios or for a neutral gear for coasting without pedaling, and the drive shafts are rigidly mounted to the frame.

Jocelyn, U.S. Pat. No. 620,929 discloses a dual drive shaft driven bicycle which has a double faced bevel gear which is constantly engaged with two pinion gears at the forward end of drive shafts. The pedal gear box is joined to the rear wheel gear box by a pair of laterally spaced tubular tie bars in which the drive shafts are journalled. A pair of bevel gears are slidably mounted on the axle of the rear wheel hub and are moved laterally to engage either of two pinion gears at the rear end of the drive shafts or an intermediate neutral position between the bevel gears to allow the bicycle to coast without pedaling. The gear boxes and tie bars are formed in an upper half and a lower half which ar joined together to surround the drive shafts and gears, and form an integral rigid portion of the frame. The pinion gears are provided with a polygonal socket and the ends of the drive shafts are provided with a mating polygonal end which is received in the pinion gear sockets. Thus, the drive shafts move axially relative to the pinion gears to compensate for slight yielding of the bicycle frame in use.

Schoenthal, U.S. Pat. No. 653,968 discloses a single drive shaft driven bicycle which has a bevel gear at one side of the crank hanger which is constantly engaged with a pinion gear at the forward end of a drive shaft. The drive shaft extends rotatably through a tubular member of a frame component having a pair of parallel support tubes above and below the drive shaft tube which are rigidly secured to the crank hanger at their forward end and to a D-shaped bracket at their rearward end which supports the rear wheel and the rear stays. The frame component which carries the drive shaft forms an integral rigid portion of the frame. The power is applied equally only on one side of the rear wheel and there is no provision for selective gear ratios or for coasting without pedaling.

Brown et al, U.S. Pat. No. 744,038 discloses a single drive shaft driven bicycle which has a bevel gear at one side of the crank hanger which is constantly engaged with a pinion gear at the forward end of a drive shaft. The drive shaft extends rotatably through a tubular member of a frame component which is rigidly secured to the crank hanger the forward end and to a pinion gear housing at the rearward end which supports the rear wheel and the rear stays. The frame component which carries the drive shaft forms an integral rigid portion of the frame. The power is applied only on one side of the rear wheel and there is no provision for selective gear ratios or for coasting without pedaling.

Hussey, U.S. Pat. No. 2,378,634 discloses a single drive shaft driven bicycle which has a circular face gear in the crank hanger which is dished outwardly from the hub and has three concentric rings of gear teeth of different diameters. The drive shaft extends rotatably through a tubular member of a frame component which is rigidly secured to the crank hanger the forward end and to a bevel gear housing at the rearward end which supports the rear forks of the frame. A pinion gear slidably mounted on the forward end of the drive shaft slides axially on the drive shaft to engage selective ones of the rings of gear teeth on the face gear to change gears or to be positioned in a neutral position. The tubular component which carries the drive shaft forms an integral rigid portion of the frame.

Mendoza, U.S. Pat. No. 3,861,715 discloses a single drive shaft driven bicycle which has a large diameter crown gear at one side of the crank hanger. The drive shaft extends rotatably through a tubular member of a frame component which is rigidly secured t the crank hanger the forward end and to a gear housing at the rearward end which supports the rear forks of the frame. A pinion gear secured on the forward end of the drive shaft is engaged with the gear teeth of the crown gear and a set of conical gears at the rear of the drive shaft are connected to a free-wheeling mechanism in the hub of the rear wheel to allow coasting without pedaling. There is no provision for changing gears and the tubular component which carries the drive shaft forms an integral rigid portion of the frame.

Conventional chain driven bicycles have a rigid frame comprising a downtube, seat tube, and a pair of horizontal chain stays which are secured to a crank hanger which contains the pedal assembly. The chain stays are rods or tubes which extend horizontally rearward and have a slotted bracket or dropout secured to the rear ends into which the rear wheel is mounted. The frame also includes a pair of seat stays which are rigid tubular members secured at their top ends to the seat tube and to the rear wheel dropouts at their bottom ends. The seat tube, chain stays, and seat stays form the rigid rear triangle of the bicycle frame.

The chainless, or drive shaft driven, bicycles of the prior art replace one or both horizontal chain stays with a hollow tube which contains the drive shaft. However, these tubular members are rigidly secured to the crank hanger and have a rear wheel bracket or gear box at their rearward ends, and a pair of rigid seat stays or tubular braces are secured angularly between the seat tube and the rear wheel bracket or gear boxes. Thus, these chainless bicycles also provide a rigid rear triangle for the bicycle frame. This rigid frame construction subjects the gear drive train and gear mechanisms to vibration, jarring, and impact, and the rigidly mounted gears would soon become misaligned and damaged.

The present invention is distinguished over the prior art in general, and these patents in particular by a chainless bicycle having a frame with a top bar, steering tube, front forks, front wheel, handlebar assembly, seat assembly, seat tube, and front downtube. The seat tube and front downtube extend angularly downwardly and are connected at their lower ends to a special crank hanger which pivotally supports a pedal gear box containing drive gears connected to the pedal arms. A pair of hollow support tubes connected to the pedal gear box extend rearwardly to a rear wheel gear box at each side of the rear wheel. A drive shaft is rotatably carried in each support tube and each has a bevel gear at the front end selectively engaged with the drive gears in the pedal gear box and a bevel gear at the rear end inside the rear wheel gear box. The hub of the rear wheel has a drive and braking mechanism which is connected to bevel gears at each side. The gears of the rear wheel hub are received in toothed engagement with the bevel gears in the rear wheel gear boxes. A pair of fluid shock absorbers are mounted between the rear wheel gear boxes and the seat tube. Thus, the chainless bicycle has a "floating" drive train and rear wheel suspension system to isolate the gear drive train from jarring, vibration, and impact, and prevent the gear drive members from becoming misaligned and damaged.

SUMMARY OF THE INVENTION

It is therefore an object of the present invention to provide a chainless bicycle which is driven by a drive shaft and gear train.

It is another object of this invention to provide a chainless bicycle which is driven by a "floating" drive shaft and gear train assembly which is pivotally secured to the bicycle frame.

Another object of this invention is to provide a chainless bicycle which is driven by a "floating" drive shaft and gear train assembly which supports the rear wheel and is pivotally secured to the bicycle frame and has shock absorbers mounted between the rear wheel support and the bicycle frame to isolate the gear drive train from jarring, vibration, and impact, and prevent the gear drive members from becoming misaligned and damaged.

Another object of this invention is to provide a rugged all-terrain chainless bicycle which has a wide range of gear ratios which can be ridden on very rough terrain and subjected to much abuse.

A further object of this invention is to provide a chainless bicycle which is driven by a "floating" drive shaft and gear train assembly which supports the rear wheel and has a drive and braking mechanism inside the rear wheel hub which transmits driving power to the rear wheel in the course of normal forward motion of the pedal arms, allows freewheeling or coasting when the pedal arms are at rest, or braking when the pedal motion is reversed.

A still further object of this invention is to provide a chainless bicycle which is driven by a "floating" drive shaft and gear train assembly which is simple in construction, economical to manufacture, and rugged and durable in use.

Other objects of the invention will become apparent from time to time throughout the specification and claims as hereinafter related.

The above noted objects and other objects of the invention are accomplished by a chainless bicycle which has a frame with a top bar, steering tube, front forks, front wheel, handlebar assembly, seat assembly, seat tube, and front downtube. The seat tube and front downtube extend angularly downwardly and are connected at their lower ends to a special crank hanger which pivotally supports a pedal gear box containing drive gears connected to the pedal arms. A pair of hollow support tubes connected to the pedal gear box extend rearwardly to a rear wheel gear box at each side of the rear wheel. A drive shaft is rotatably carried in each support tube and each has a bevel gear at the front end selectively engaged with the drive gears in the pedal gear box and a bevel gear at the rear end inside the rear wheel gear box. The hub of the rear wheel has a drive and braking mechanism which is connected to bevel gears at each side. The gears of the rear wheel hub are received in toothed engagement with the bevel gears in the rear wheel gear boxes. A pair of fluid shock absorbers are mounted between the rear wheel gear boxes and the seat tube. Thus, the chainless bicycle has a "floating" drive train and rear wheel suspension system to isolate the gear drive train from jarring, vibration, and impact, and prevent the gear drive members from becoming misaligned and damaged

DESCRIPTION OF THE PREFERRED EMBODIMENT

Figure 1:
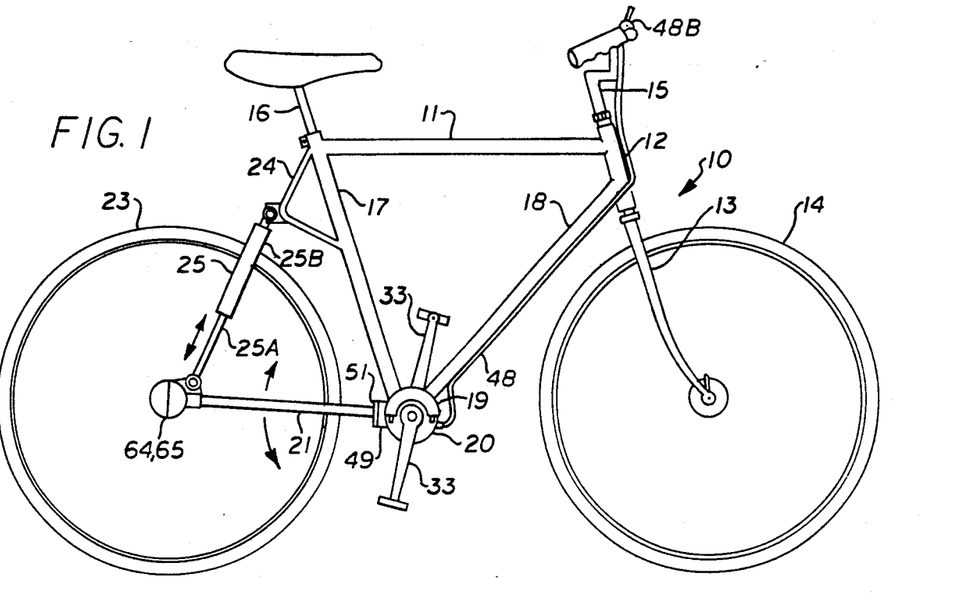
FIG. 1 is a side elevation of a chainless bicycle in accordance with the present invention.
Figure 2:
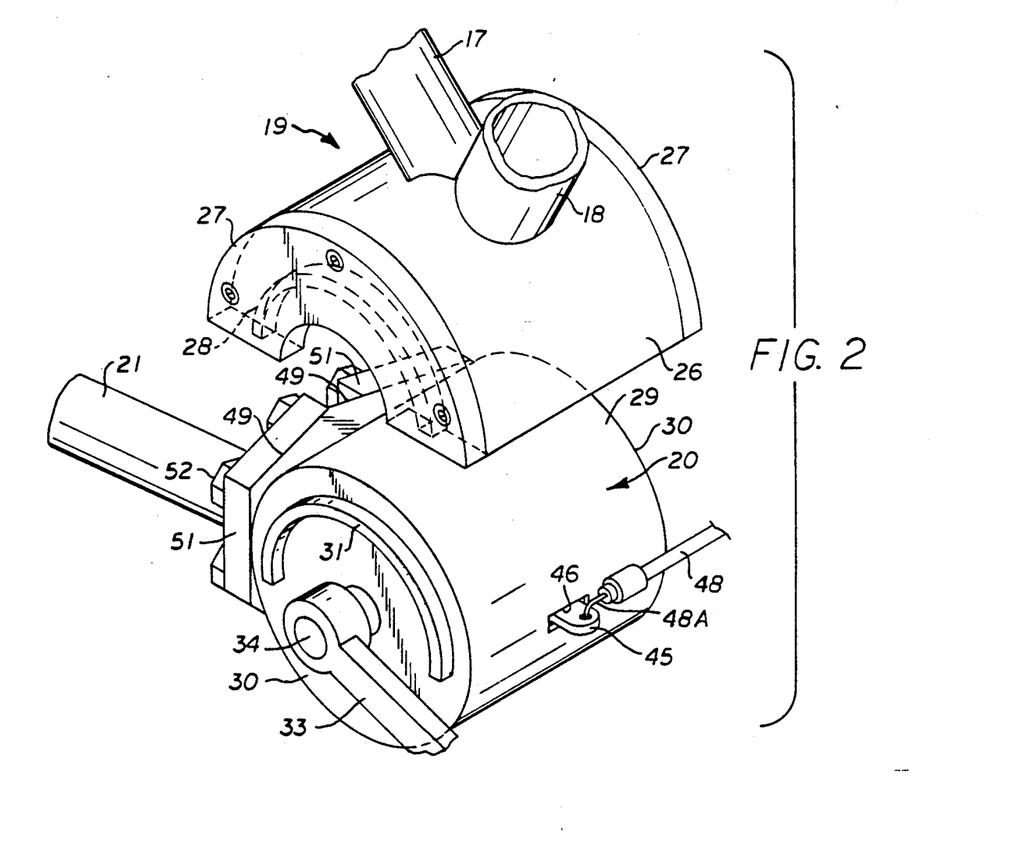
FIG. 2 is an exploded isometric view of the crank hanger and pedal gear box of the chainless bicycle.

Referring to the drawings by numerals of reference, there is shown in FIG. 1, a preferred chainless bicycle 10 in accordance with the present invention. The bicycle 10 has the usual top bar 11, steering tube 12, front forks 13, front wheel 14, handlebar assembly 15, seat assembly 16, a seat tube 17, and front downtube 18. The seat tube 17 and front downtube 18 extend angularly downwardly and are connected at their lower ends to a special crank hanger 19 (described hereinafter). A pedal gear box 20 is pivotally supported in the crank hanger 19.

It should be noted that unlike prior art chain driven or chainless bicycle frames, the frame of the present bicycle 10 does not have the customary rigid rear triangle. The chain driven and drive shaft driven bicycles of the prior art have tubular members rigidly secured to the crank hanger and have a rear wheel bracket or gear box at their rearward ends, and a pair of seat stays or tubular braces rigidly secured at their top ends to the seat tube and to the rear wheel bracket or gear box at their bottom ends. These components are all rigidly secured together to form an integral rigid triangular portion of the frame which supports the rear wheel.

The present chainless bicycle, on the other hand, has a pedal gear box 20 pivotally supported in the crank hanger 19. A pair of hollow tubular support members 21 are connected to the pedal gear box 20 at their forward end and each extends rearwardly to a rear wheel gear box 64–65 at each side of the rear wheel 23. The rear wheel 23 is connected to the rear wheel gear boxes 64 and 65, as explained in detail hereinafter. A pair of laterally spaced mounting bars 24 are secured to the upper portion of the seat tube 17. A pair of fluid shock absorbers 25 each have their upper end mounted on the mounting bars 24 and their lower end mounted on the laterally spaced rear wheel gear boxes 64 and 65.

Thus, as indicated by arrows in FIG. 1, the present chainless bicycle provides a "floating" drive train and rear wheel suspension system to isolate the gear drive train from jarring, vibration, and impact, and prevent the gear drive members from becoming misaligned and damaged.

Referring now to FIGS. 2 through 5,, the special crank hanger assembly is shown. The seat tube 17 and front downtube 18 extend angularly downward and are connected at their lower ends to an arcuate crank hanger housing 26. The arcuate housing 26 has semi-circular end plates 27 secured at each lateral side. The inner surface of each end plate 27 is provided with an arcuate groove or slot 28 open at the bottom surface of the end plates. The pedal gear box 20 is a generally cylindrical configuration having an arcuate upper portion 29 of smaller radius than the arcuate interior surface of the housing 26. The lateral side walls 30 of the pedal gear box 20 each have an arcuate raised rail 31 projecting outwardly therefrom.

Figure 5:
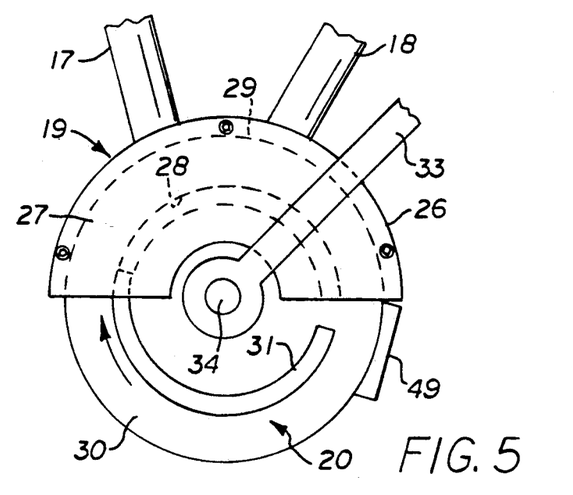
FIG. 5 is a side elevation showing one method of installing the pedal gear box into the crank hanger.

The pedal gear box 20 is installed in the housing 26 by placing the gear box 20 beneath the housing and then securing the end plates 27 on the lateral sides of the housing such that the arcuate rails 31 are slidably received in the arcuate slots 28. As shown in FIG. 5, the pedal gear box 20 may also be in the housing 26 with the end plates 27 already secured thereon by placing the gear box 20 beneath the end plates 27 such that the ends of the rails 31 are aligned with the open bottom ends of the slots 28 and then rotating the gear box 20 such that one end of the rails 28 is received in the open ends of the slots and continuing to rotate the gear box 20 such that the rails slide into the slots 29. Thus, after assembly, the pedal gear box 20 is free to rotate relative to the housing 26. A sleeve or pad 32 of low friction material, such as Teflon (tm I. E. Dupont) may be installed in the space between the interior surface of the housing 26 and the exterior of the gear box 20 to facilitate relative rotation.

Figure 4:
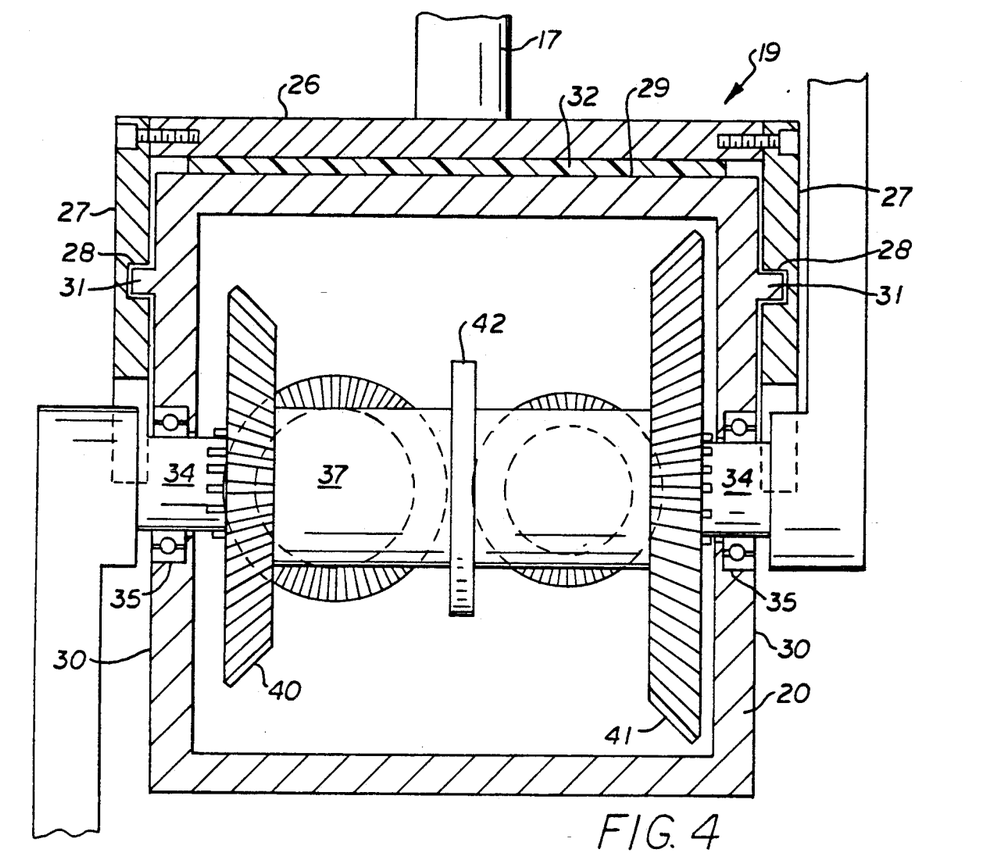
FIG. 4 is a vertical cross section through the pedal gear box and crank hanger taken along line 4—4 of FIG. 3.
Figure 6:
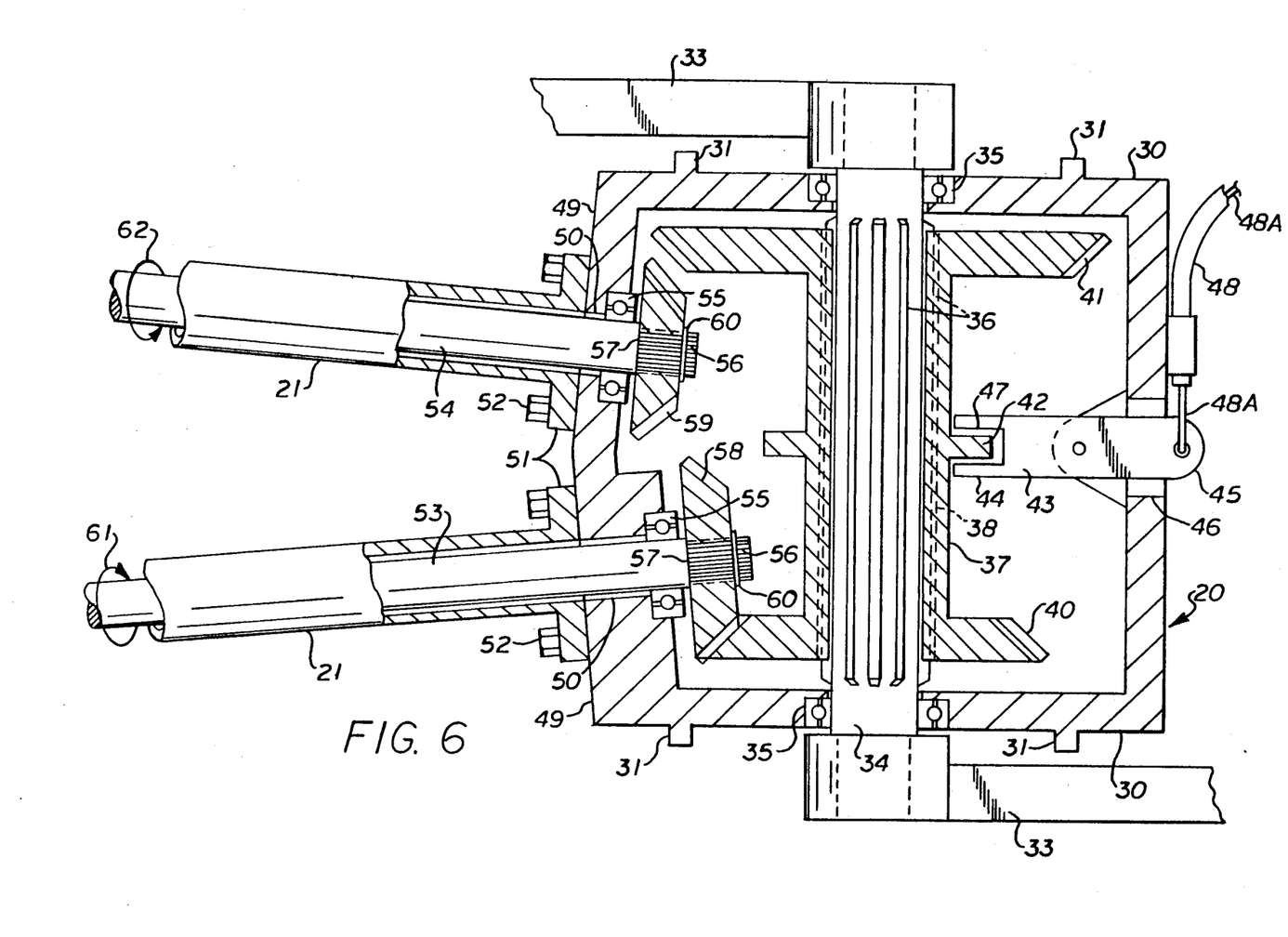
FIG. 6 is a cross section through the pedal gear box taken along line 6—6 of FIG. 3.

Referring now to FIGS. 4 and 6, the pedal gear box 20 contains the pedal drive gear assembly. The pedal arms 33 are connected to the outer ends of an axle 34 which extends through the gear box 20 and is rotatably mounted in bearings 35 in the lateral side walls 30 of the gear box 20. The exterior center portion of the axle 34 is splined 36 and a tubular sleeve 37 having an interior mating splined surface 38 is slidably engaged on the axle 34 for axial movement relative to the axle and is rotated by the axle when the pedal arms 33 are turned.

A first bevel drive gear 40 of predetermined diameter is secured to one end of the sleeve 37 and a second bevel drive gear 41 of a different diameter is secured to the other end of the sleeve with their toothed surfaces facing inward. The sleeve 37 has a circular ring 42 intermediate its ends which extends radially outward from its periphery. A shifting lever 43 is pivotally connected in the gear box 20 and has one end 44 extending inwardly and another end 45 extending outwardly through a slot 46 in the wall of the gear box 20. Suitable seal members (not shown) are installed around the slot 46 to prevent leakage of lubricant contained in the gear box 20 while allowing pivotal movement of the shifting lever 43.

The inward end 44 of the shifting lever 43 has a slot 47 which straddles the ring 42 and its outer end 45 is apertured to receive the inner cable 48A of a sheathed cable 48. The sheathed cable 48 is secured to the exterior of the gear box 20, and its inner cable 48A is connected to a manual shifter mechanism (48B) mounted on the frame of the bicycle. As the lever 43 is pivoted by the manual shifter mechanism, 48B the sleeve 37 and bevel drive gears 40 and 41 are moved axially on the splined axle 34.

As best seen in FIG. 6, the rear end of the pedal gear box 20 is provided with a pair of outwardly angled flat surfaces 49. A pair of bores 50 extend through each flat surface 49 and the rear end of the gear box 20. A pair of hollow support tubes 21, each having a flange 51 at their forward end, are secured by bolts 52 to the flat surfaces 49 at the rear end of the gear box 20. Drive shafts 53 and 54 are rotatably mounted inside the support tubes 21. The forward end of the drive shafts 53 and 54 extend through the bores 50 and bearings 55 into the gear box 20. The forward ends of the drive shafts 53 and 54 have a reduced diameter splined portion 56 at the front end which define a shoulder 57 at the back end of the splined portion. Bevel gears 58 and 59 having a splined interior bore are mounted on the front ends of the drive shafts 53 and 54, respectively, and secured by a snap ring 60.

The bevel drive gears 40 and 41 on the sleeve 37 are positioned to the outer sides of the bevel gears 58 and 59, and are spaced apart a sufficient distance such that when one drive gear 40, for example, is engaged with the bevel gear 58 at one side, the laterally opposed drive gear 41 will be clear of the other bevel gear 59, and vice versa. Thus, the gears may be shifted from a first gear ratio to a second gear ratio by sliding the sleeve 37 axially on the splined axle 34. As the pedal arms 33 are turned, both drive gears 40-41 rotate with the axle in the same direction, and as one drive gear 40, for example, engages bevel gear 58, it will rotate the drive shaft 53 in one direction, as indicated by arrow 61 and when the laterally opposed drive gear 41 is engaged with the other bevel gear 59, it will rotate the other drive shaft 54 in the opposite direction as indicated by arrow 62. Thus, the drive shafts 53 and 54 rotate in opposite directions.

Figure 3:
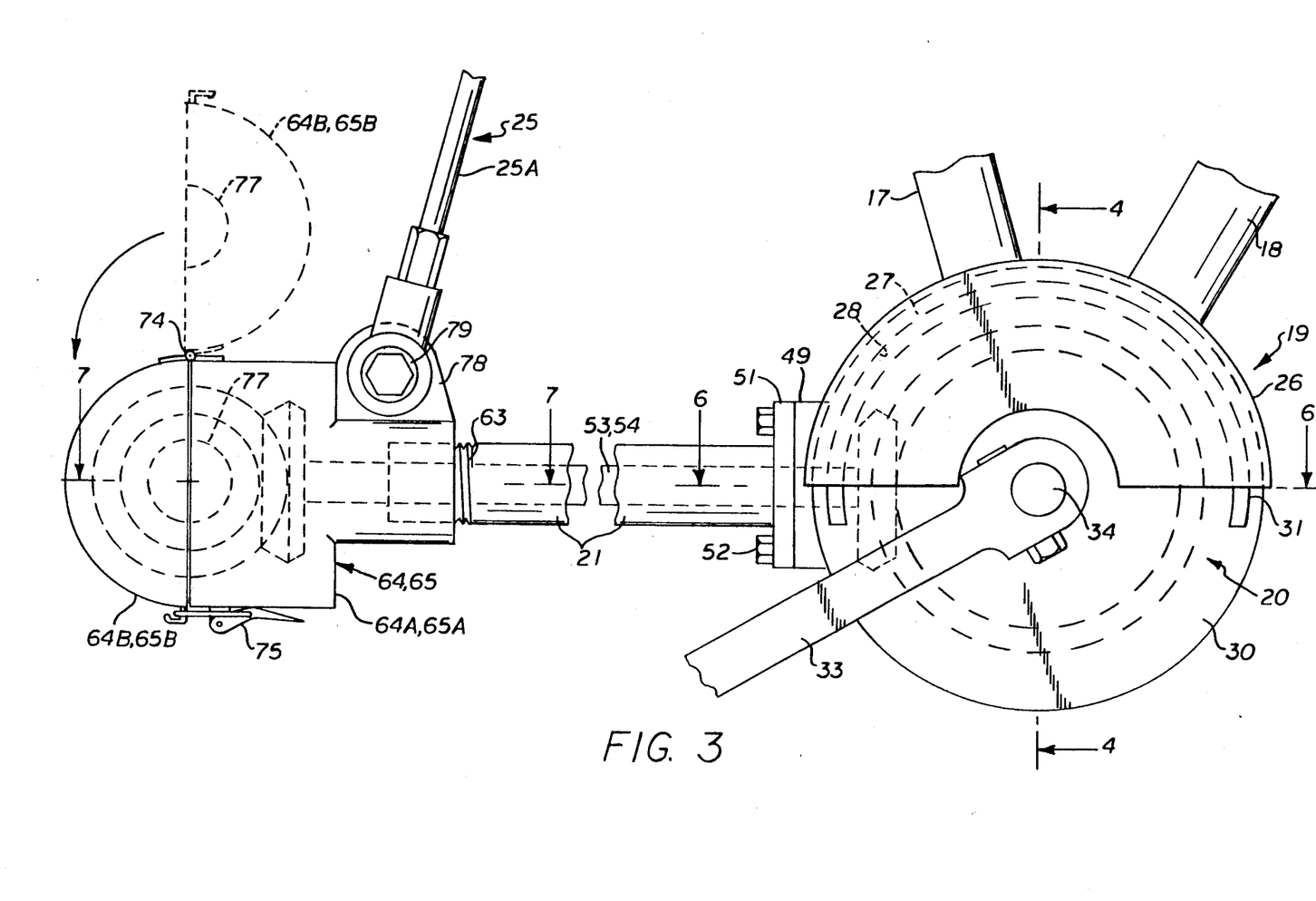
FIG. 3 is a side elevation of the drive train assembly of the chainless bicycle.
Figure 7:
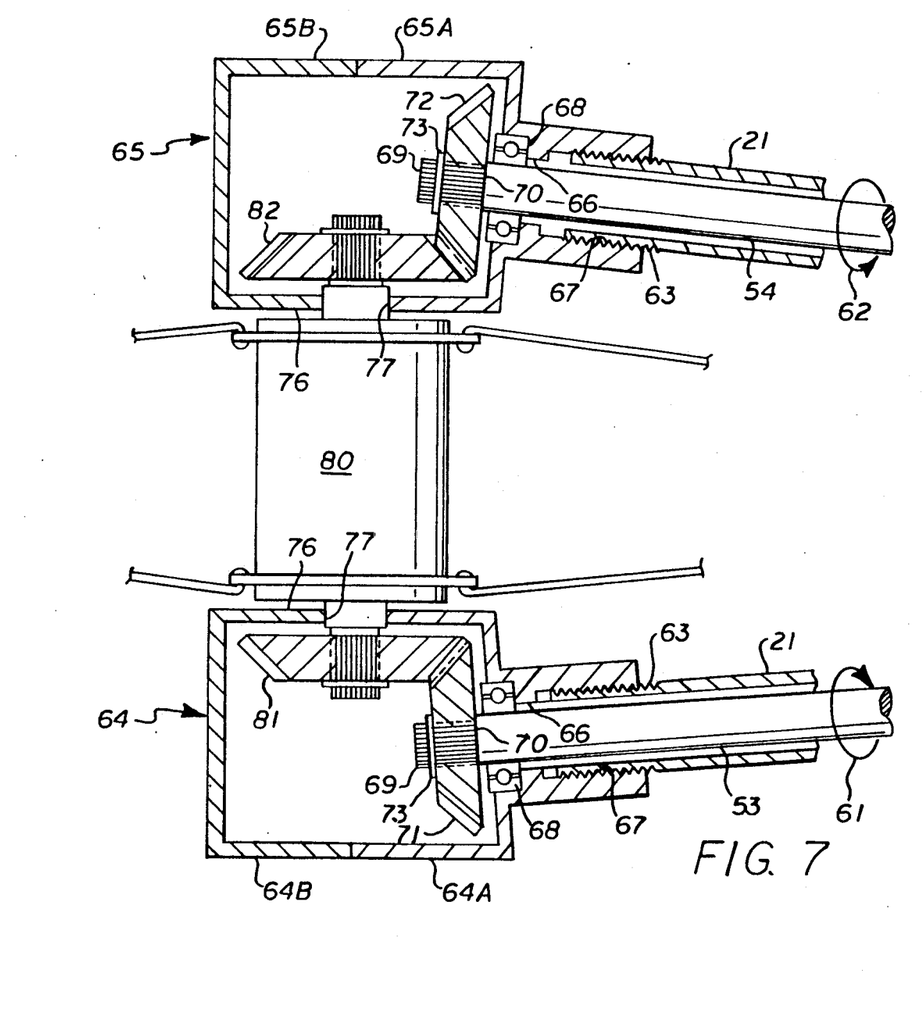
FIG. 7 is a cross section through the rear wheel gear box taken along line 7—7 of FIG. 3.

As shown in FIGS. 3 and 7, the rearward ends of the support tubes 21 are provided with external threads 63. A pair of rear wheel gear boxes 64 and 65, each having a central bore 66 and an internally threaded portion 67 are threadedly connected to the rearward end of the support tubes 21. The rearward ends of the drive shafts 53 and 54 extend through the bores 66 and bearings 68 into the rear wheel gear boxes 64-65, respectively. The rearward ends of the drive shafts 53 and 54 have a reduced diameter splined portion 69 at the rear end which define a shoulder at the end of the splined portion. A second set of bevel gears 71 and 72 having a splined interior bore are mounted on the rear ends of the drive shafts 53 and 54, respectively, and secured by a snap ring 73.

The rear wheel gear boxes 64 and 65 are generally cup-shaped two-piece configurations having a front portion 64A-65A and a rear portion 64B-65B which are connected together by a hinge 74. A quick release latch 75 releasably secures the two portions 64A-65A and 64B-65B together. The inward facing side walls 76 of the rear wheel gear boxes 64 and 65 are provided with a segmented opening 77. A mounting ear 78 having a hole therethrough extends upwardly from the top of the front portion 64A-65A of the rear wheel gear boxes 64 and 65. A pair of fluid shock absorbers 25 each have the lower end of their piston rod 25A pivotally mounted to the ear 78 of the rear wheel gear boxes 64 and 65 by a bolt connection 79. Each shock absorber 25 has its upper end 25B mounted on the mounting bars 24 which are secured to the seat tube 17, as seen in FIG. 1.

The rear wheel hub 80 preferably contains a freewheel drive and braking apparatus which is conventional in the art and therefore not shown in detail. Bevel gears 81 and 82 are secured to the drive components of the driving and braking apparatus contained in the rear wheel hub, or to a shaft suitably connected to such components. The rear wheel is easily and quickly mounted by pivoting the rear portion 64B-65B of each rear wheel gear box 64 and 65 upwardly and moving the rear wheel forward such that the bevel gears 81 and 82 at each side of the hub 80 engage the bevel gears 71 and 72 inside the gear boxes 64 and 65 and then closing and latching the rear portion 64B-65 of the rear wheel gear boxes.

The bevel gears 71 and 72 connected to the rear end of the drive shafts 53 and 54 remain engaged on the outer sides of the gears 81 and 82 connected to the drive components inside the rear wheel hub 80. As shown by arrows in FIG. 6, the drive shaft bevel gears 71 and 72 rotate in opposite directions and will rotate the hub 80 in a forward direction when either drive shaft 53-54 is engaged with either of the bevel drive gears 40-41 in the pedal gear box 20.

The drive and braking mechanism inside the rear wheel hub 80 transmits the driving power of the drive shaft 53 or 54 to the rear wheel in the course of normal forward motion of the pedal arms 33, allows freewheeling or coasting when the pedal arms are at rest, or braking when the pedal motion is reversed.

It should be understood, that the gear arrangements are illustrated somewhat schematically in the drawings for purposes of illustration and that various combinations of diameters and number of teeth may be selected to provide a desired combination of gear ratios. Various conventional rear wheel drive mechanisms may also be incorporated in the rear Wheel hub and modified by installing bevel gears onto the drive members. The rear wheel hub may also be provided with a direct gear drive assembly and utilize hand brakes rather than an internal braking mechanism.

While this invention has been described fully and completely with special emphasis upon a preferred embodiment, it should be understood that within the scope of the appended claims the invention may be practiced otherwise than as specifically described herein.

I claim:

1. A chainless bicycle having a drive shaft and floating drive train suspension system comprising in combination;

a frame including a crank hanger for pivotally supporting a pedal gear box, a seat tube connected to said crank hanger and having an upper end extending upwardly therefrom adapted to support a seat, a front downtube connected to said crank hanger and having an upper end extending upwardly therefrom, a steering tube connected to said upper end of said front downtube and adapted to receive a handlebar and front fork assembly, and a top bar extending between said seat tube and said steering tube;

an elongate drive train assembly having a pedal gear box at a forward end pivotally supported by said crank hanger and containing drive gear means, an elongate tubular housing secured at a forward end to said pedal gear box, a rear wheel gear box secured at a rearward end of said tubular housing adapted to receive a hub of a rear wheel and containing rear wheel gear means connected with said rear wheel hub for imparting rotation to said rear wheel hub, and a drive shaft rotatably mounted within said tubular housing and extending between said pedal gear box and said rear wheel gear box and having a gear at a forward end to engage said drive gear means in said pedal gear box and a gear at a rearward end to engage said rear wheel gear means for transmitting rotary motion from said drive gear means to said rear wheel hub;

said drive gear means including an axle rotatably mounted in said pedal gear box and having laterally opposed ends extending outwardly therefrom and each end configured to receive a pedal arm having a foot pedal at one end for rotating said axle, at least one drive gear slidably mounted on said axle for axial sliding movement relative thereto and keyed thereon for rotation as a unit with said axle, and shifting means on said pedal gear box having one end operatively connected with said at least one drive gear and having another end adapted to be connected with manual manipulating means for manually moving said at least one drive gear axially on said axle to engage and disengage said at least one drive gear with said gear at the forward end of said drive shaft; and a shock absorber connected between said rear wheel gear box and said seat tube for allowing pivotal movement of said drive train assembly relative to said frame to prevent misalignment of said drive shaft and said gear means and insulating said drive train assembly from shock and vibration imparted to said frame.

2. The chainless bicycle according to claim 1 in which said crank hanger comprises an arcuate crank housing having an arcuate interior surface with arcuate support means therein, said pedal gear box has an arcuate upper portion of smaller radius than said crank housing arcuate interior surface and arcuate support means thereon slidably engaged with said crank housing support means, and said pedal gear box is pivotally supported by said slidably engaged arcuate support means in said crank hanger housing to allow pivotal movement of said drive train assembly with respect to said frame.

3. The chainless bicycle according to claim 1 including:

a rear wheel having hub containing interior freewheel drive and braking means for causing and preventing rotation of said rear wheel hub and having an exterior gear at one side of said rear wheel hub connected with said freewheel drive and braking means, said exterior gear received in said rear wheel gear box and engaged with said gear at the rearward end of said drive shaft, and said drive shaft transmitting rotary motion to said drive and braking means to selectively engage and disengage said rear wheel hub to transmit rotary power of said drive shaft to said rear wheel in the course of normal forward motion of the pedals, to allow freewheeling and coasting when the pedals are at rest, and to cause braking and prevent rotation of said rear wheel hub when the pedal motion is reversed.

4. The chainless bicycle according to claim 1 in which;

said drive train assembly comprises a pair of said tubular housings, each having a forward end secured to said pedal gear box, and a pair of said rear wheel gear boxes, each secured to a rearward end of each said tubular housing, and a pair of said drive shafts, each rotatably mounted within each of said outer tubular housings and each having a gear at a forward end to engage said drive gear means in said pedal drive gear box and a gear at a rearward end to be engaged with said rear wheel gear means in said rear wheel gear box;

a pair of shock absorbers each connected between one of said pair of rear wheel gear boxes and said seat tube;

said drive gear means has a pair of said drive gears slidably mounted on said axle for axial sliding movement relative thereto and keyed thereon for rotation as a unit with said axle; and said shifting means has one end operatively connected with said pair of drive gears and has another end adapted to be connected with manual manipulating means for manually moving said pair of drive gears axially on said axle to selectively move one of said pair of drive gears into engagement with one of said gears at the forward end of one said pair of drive shafts and simultaneously disengage the other one of said pair of drive gears from the other one of said gears at the forward end of the other of one of said pair of drive shafts.

5. The chainless bicycle according to claim 4 including;

a rear wheel having a hub containing interior freewheel drive and braking means for causing and preventing rotation of said rear wheel hub and having a pair of exterior gears, one at each side of said rear wheel hub and each connected with said freewheel drive and braking means, each said exterior gear received in one of each of said pair of rear wheel gear boxes and engaged with said gear at the rearward end of each said drive shaft, and each said drive shaft transmitting rotary motion to said drive and braking means to selectively engage and disengage said rear wheel hub to transmit rotary power of said drive shaft to said rear wheel in the course of normal forward motion of the pedals, to allow freewheeling and coasting when the pedals are at rest, and to cause braking and prevent rotation of said rear wheel hub when the pedal motion is reversed.

6. A drive shaft and floating drive train assembly for connection to a bicycle frame of the type having a top bar, a seat tube connected to the top bar having an upper end for supporting a seat and a bottom end extending downwardly therefrom, a steering tube connected to the top bar and adapted to receive a handlebar and front fork assembly, a front downtube connected at an upper end to the steering tube and having a bottom end extending downwardly therefrom, the drive shaft and floating drive train assembly comprising;

a crank hanger adapted to be secured to the bottom ends of the seat tube and front downtube;

a pedal gear box pivotally mounted on said crank hanger and containing drive gear means;

a pair of elongate tubular support members each secured at a forward end to said pedal gear box and each having a rearward end extending rearwardly therefrom to straddle a rear wheel;

a rear wheel gear box secured at the rearward end of each said tubular support member and adapted to support a hub of the rear wheel and each containing rear wheel gear means connected with the rear wheel hub for imparting rotation to the rear wheel hub;

a drive shaft rotatably mounted in each said tubular support member and extending between said pedal gear box and said rear wheel gear box, each said drive shaft having a gear at a forward end to engage said drive gear means in said pedal gear box and a gear at a rearward end to engage said rear wheel gear means in said rear wheel gear box for transmitting rotary motion from said drive gear means to the rear wheel hub;

said drive gear means including an axle rotatably mounted in said pedal gear box and having laterally opposed ends extending outwardly therefrom and each end configured to receive a pedal arm having a foot pedal at one end for rotating said axle, a pair of drive gears slidably mounted on said axle for axial sliding movement relative thereto and keyed thereon for rotation as a unit with said axle, and shifting means on said pedal gear box having one end operatively connected with said a pair of drive gears and having another end adapted to be connected with manual manipulating means for manually moving said pair of drive gears axially on said axle to selectively move one of said pair of drive gears into engagement with one of said gears at the forward end of one of said drive shafts and simultaneously disengage the other one of said pair of drive gears from the other one of said gears at the forward end of the other one of said pair of drive shafts; and a pair of shock absorbers each having a bottom end connected to one of said rear wheel gear boxes and having an upper end adapted to be connected to the seat tube for allowing pivotal movement of said pedal gear box relative to said crank hanger to prevent misalignment of said drive shafts and said gear means and insulating said drive train assembly from shock and vibration imparted to said frame.

7. The drive shaft and floating drive train assembly according to claim 6 in which said crank hanger comprises an arcuate crank housing having an arcuate interior surface with arcuate support means therein, said pedal gear box has an arcuate upper portion of smaller radius than said crank housing arcuate interior surface and arcuate support means thereon slidably engaged with said crank housing support means, and said pedal gear box is pivotally supported by said slidably engaged arcuate support means in said crank hanger housing to allow pivotal movement of said drive train assembly with respect to said frame.

8. The drive shaft and floating drive train assembly according to claim 6 including;

a rear wheel having a hub containing interior freewheel drive and braking means for causing and preventing rotation of said rear wheel hub and having a pair of exterior gears, one at each side of said rear wheel hub and each connected with said freewheel drive and braking means;

each said exterior gear received in one of each of said pair of rear wheel gear boxes and engaged with said gear at the rearward end of each said drive shaft; and each said drive shaft transmitting rotary motion to said drive and braking means to selectively engage and disengage said rear wheel hub to transmit rotary power of said drive shaft to said rear wheel in the course of normal forward motion of the pedals, to allow freewheeling and coasting when the pedals are at rest, and to cause braking and prevent rotation of said rear wheel hub when the pedal motion is reversed.

9. In a bicycle having a top bar, a seat tube connected to the top bar having an upper end for supporting a seat and a bottom end extending downwardly therefrom, a steering tube connected to the top bar and adapted to receive a handlebar and front fork assembly, a front downtube connected at an upper end to the steering tube and having a bottom end extending downwardly therefrom, and a crank hanger secured to the bottom ends of the seat tube and front downtube; the combination of a drive shaft drive train assembly and a shock absorbing system in which:

said drive shaft drive train assembly comprises; a pedal gear box pivotally mounted on said crank hanger and containing drive gear means, a pair of elongate tubular support members each secured at a forward end to said pedal gear box and each having a rearward end extending rearwardly therefrom to straddle a rear wheel, a rear wheel gear box secured at the rearward end of each said tubular support member and adapted to support a hub of the rear wheel and each containing rear wheel gear means connected with the rear wheel hub for imparting rotation to the rear wheel hub, and a drive shaft rotatably mounted in each said tubular support member and extending between said pedal gear box and said rear wheel gear box, each said drive shaft having a gear at a forward end to engage said drive gear means in said pedal gear box and a gear at a rearward end to engage said rear wheel gear means in said rear wheel gear box for transmitting rotary motion from said drive gear means to the rear wheel hub; and said shock absorbing system comprises a pair of shock absorbers each having a bottom end connected to one of said rear wheel gear boxes and having an upper end connected to the seat tube for allowing pivotal movement of said pedal gear box relative to said crank hanger to prevent misalignment of said drive shafts and said gear means and insulating said drive train assembly from shock and vibration imparted to said frame.

10. The bicycle according to claim 9 in which the crank hanger comprises an arcuate crank housing having an arcuate interior surface with arcuate support means therein, and said pedal gear box has an arcuate upper portion of smaller radius than said crank housing arcuate interior surface and arcuate support means thereon slidably engaged with said crank housing support means, and said pedal gear box is pivotally supported by said slidably engaged arcuate support means in said crank hanger housing to allow pivotal movement of said drive train assembly with respect to said frame.

* * * * *